(12) United States Patent
Hanrahan et al.

(10) Patent No.: US 7,580,225 B2
(45) Date of Patent: Aug. 25, 2009

(54) TOLERANCE RING HAVING VARIABLE HEIGHT AND/OR ASSYMMETRICALLY LOCATED BUMPS

(75) Inventors: Kevin P. Hanrahan, Santa Barbara, CA (US); Ryan J. Schmidt, Santa Barbara, CA (US); David D. Dexter, Goleta, CA (US)

(73) Assignee: Intri-Plex Technologies, Inc., Santa Barbara, CA (US)

( * ) Notice: Subject to any disclaimer, the term of this patent is extended or adjusted under 35 U.S.C. 154(b) by 276 days.

(21) Appl. No.: 11/504,316

(22) Filed: Aug. 15, 2006

(65) Prior Publication Data

US 2008/0043375 A1    Feb. 21, 2008

(51) Int. Cl.
G11B 21/02    (2006.01)
(52) U.S. Cl. .................................................. 360/265.6
(58) Field of Classification Search .............. 360/264.3, 360/265.2, 265.6; 403/365; 464/30; 114/244
See application file for complete search history.

(56) References Cited

U.S. PATENT DOCUMENTS

| | | | |
|---|---|---|---|
| 1,662,544 A | 3/1928 | Solenberger | |
| 2,325,616 A * | 7/1943 | Landweber | 114/244 |
| 2,628,113 A | 2/1953 | Jones | |
| 2,886,354 A | 5/1959 | Bjorklund | |
| 2,897,026 A | 7/1959 | Haller et al. | |
| 2,931,412 A | 4/1960 | Wing | |
| 2,950,937 A | 8/1960 | Bedford, Jr. | |
| 3,061,386 A | 10/1962 | Dix et al. | |
| 3,125,397 A | 3/1964 | McGrath | |
| 3,142,887 A | 8/1964 | Hulck et al. | |
| 3,145,547 A | 8/1964 | Lyons | |
| 3,156,281 A | 11/1964 | Demi | |
| 3,197,243 A | 7/1965 | Brenneke | |
| 3,233,497 A | 2/1966 | McCormick | |
| 3,396,554 A | 8/1968 | Westercamp | |
| 3,494,676 A | 2/1970 | Compton | |
| 3,672,708 A | 6/1972 | Zemberry | |
| 3,700,271 A | 10/1972 | Blaurock et al. | |
| 3,730,569 A | 5/1973 | Feinler | |
| 3,768,845 A | 10/1973 | Gilliland | |
| 3,838,928 A | 10/1974 | Blaurock et al. | |
| 3,861,815 A | 1/1975 | Landaeus | |
| 4,069,618 A | 1/1978 | Geiss | |
| 4,222,310 A | 9/1980 | Garrett et al. | |

(Continued)

FOREIGN PATENT DOCUMENTS

DE    916370    8/1954

(Continued)

OTHER PUBLICATIONS

Definition for "Symmetry." Web Rerport, before 2000.*

(Continued)

*Primary Examiner*—Tianjie Chen

(57) ABSTRACT

A tolerance ring configured to reduce torque ripple for a pivot bearing in an actuator arm assembly. The tolerance ring comprises a cylinder having a predetermined length, and a first and a second row of contacting portions arranged around the surface of the cylinder, the contacting portions of the second row are circumferentially displaced with respect to the first row by a distance greater than zero but less than the distance of the contacting portion and the spacing between adjacent contacting portions in the first row.

20 Claims, 10 Drawing Sheets

U.S. PATENT DOCUMENTS

| | | | |
|---|---|---|---|
| 4,286,894 A | 9/1981 | Rongley | |
| 4,790,683 A | 12/1988 | Cramer, Jr. et al. | |
| 4,828,423 A | 5/1989 | Cramer, Jr. et al. | |
| 4,981,390 A | 1/1991 | Cramer, Jr. et al. | |
| 5,125,755 A | 6/1992 | Adler et al. | |
| 5,575,691 A | 11/1996 | Matthews | |
| 5,613,265 A | 3/1997 | Gemmell | |
| 5,647,766 A | 7/1997 | Nguyen | |
| 6,163,441 A | 12/2000 | Wood et al. | |
| 6,288,878 B1 | 9/2001 | Misso et al. | |
| 6,288,879 B1 | 9/2001 | Misso et al. | |
| 6,333,839 B1 | 12/2001 | Misso et al. | |
| 6,411,472 B1 | 6/2002 | Allsup | |
| 6,480,363 B1 | 11/2002 | Prater | |
| 6,525,910 B1 | 2/2003 | Macpherson et al. | |
| 6,527,449 B1 | 3/2003 | Koyama et al. | |
| 6,603,636 B2 | 8/2003 | Schwandt et al. | |
| 6,606,224 B2 | 8/2003 | Macpherson et al. | |
| 6,889,956 B2 | 5/2005 | Gutierrez et al. | |
| 7,085,108 B1 | 8/2006 | Oveyssi et al. | |
| 2002/0024770 A1 | 2/2002 | Hong et al. | |
| 2003/0053260 A1* | 3/2003 | Barina et al. | 360/265.6 |
| 2003/0156357 A1 | 8/2003 | Brink et al. | |
| 2004/0145830 A1 | 7/2004 | Brink et al. | |
| 2004/0238944 A1 | 12/2004 | Bish et al. | |
| 2005/0225903 A1* | 10/2005 | Sprankle et al. | 360/264.3 |
| 2006/0181811 A1* | 8/2006 | Hanrahan et al. | 360/265.2 |
| 2006/0275076 A1* | 12/2006 | Hanrahan et al. | 403/365 |
| 2006/0276246 A1* | 12/2006 | Needes et al. | 464/30 |
| 2008/0043374 A1* | 2/2008 | Hanrahan et al. | 360/265.6 |
| 2008/0043375 A1* | 2/2008 | Hanrahan et al. | 360/265.6 |

FOREIGN PATENT DOCUMENTS

| | | |
|---|---|---|
| DE | 1 855 948 | 8/1962 |
| DE | 29 50 985 | 12/1979 |
| EP | 1 067 336 | 1/2001 |
| FR | 2 627 620 | 12/1988 |
| GB | 1094610 | 6/1965 |
| GB | 1297599 | 4/1971 |
| GB | 1386738 | 2/1973 |
| GB | 2382386 | 5/2003 |
| GB | 2413594 | 11/2005 |
| GB | 2413608 | 11/2005 |
| JP | 2003-518592 | 6/2003 |
| JP | 2003-522912 | 7/2003 |
| JP | 2005-114025 | 4/2005 |
| WO | WO 01/41136 | 6/2001 |
| WO | WO 03/025907 | 3/2003 |
| WO | WO 2005/106268 | 11/2005 |
| WO | WO 2006/056731 | 6/2006 |

OTHER PUBLICATIONS

PCT International Search Report and the Written Opinion of the International Searching Authority dated Jan. 5, 2009 for International Application No. PCT/US2007/075824 filed Aug. 13, 2007.

* cited by examiner

TOLERANCE RING HAVING VARIABLE HEIGHT AND/OR ASSYMMETRICALLY LOCATED BUMPS

BACKGROUND OF THE INVENTION

1. Field of the Invention

This invention relates generally to bearing tolerance rings. More particularly, the invention pertains to tolerance rings used in cartridge bearings for actuator arms in information storage devices, such as hard disk drives.

2. Description of Related Art

A key component of any computer system is a device to store data. One common place for storing massive amounts of data in a computer system is on a disc drive. The most basic parts of a disc drive are a disc that is rotated, an actuator that moves a transducer to various locations on the disc, and electrical circuitry that is used to write and read data to and from the disc. Coupled to the actuator is a head-gimbal assembly (HGA) that includes a head and metal suspension. The HGA's can be stacked together into a head-stack assembly (HSA), which is propelled across the disk surface by the actuator. There are a variety of disc drives in use today, such as hard disc drives, zip drives, floppy disc drives. All utilize either rotary or linear actuators.

In hard disk drives, magnetic heads read and write data on the surfaces of rotating disks that are co-axially mounted on a spindle motor. The magnetically-written "bits" of information are laid out in concentric circular "tracks" on the surfaces of the disks. The disks must rotate quickly so that the computer user does not have to wait long for a desired bit of information on the disk surface to become positioned under the head. In modern disk drives, data bits and tracks must be extremely narrow and closely spaced to achieve a high density of information per unit area of the disk surface.

The required small size and close spacing of information bits on the disk surface have consequences on the design of the disk drive device and its mechanical components. Among the most important consequences is that the magnetic transducer on the head must operate in extremely close proximity to the magnetic surface of the disk. Because there is relative motion between the disk surface and the magnetic head due to the disk rotation and head actuation, continuous contact between the head and disk can lead to tribological failure of the interface. Such tribological failure, known colloquially as a "head crash," can damage the disk and head, and usually cause data loss. Therefore, the magnetic head is designed to be hydrodynamically supported by an extremely thin air bearing so that its magnetic transducer can operate in close proximity to the disk while physical contact between the head and the disk is minimized or avoided. Typically, the head-to-disk spacing present during operation of modern hard disk drives is extremely small, measuring in the tens of nanometers.

Characteristics of the actuator used for moving the magnetic transducer in close proximity to the disk must be considered by the designer to minimize vibration in response to rapid angular motions and other excitations. For example, the actuator arm must be stiff enough and the actuator pivot bearing must be of high enough quality so that the position of the head can be precisely controlled during operation. Also, the interface between the actuator arm and the pivot bearing must be of sufficient rigidity and strength to enable precise control of the head position during operation and to provide the boundary conditions necessary to facilitate higher natural resonant frequencies of vibration of the actuator arm. Typically, the actuator arm is fabricated from aluminum or an alloy of aluminum and is therefore softer and more easily scratched than the pivot bearing sleeve, which is typically fabricated from stainless steel.

The stiffness of the actuator must also be sufficient to limit deflection that might cause contact with the disk during mechanical shock events. Likewise, the interface between the actuator structure and the pivot bearing must be of sufficient strength to prevent catastrophic structural failure such as axial slippage between the actuator arm and the actuator pivot bearing sleeve during large mechanical shock events.

In many disc drives, the actuator arm or arms are fixed to the actuator pivot bearing by a tolerance ring. Typically, tolerance rings include an open cylindrical base portion and a plurality of contacting portions that are raised or recessed from the cylindrical base portion. The contacting portions are typically partially compressed during installation to create a radial preload between the mating cylindrical features of the parts joined by the tolerance ring. The radial preload compression provides frictional engagement that prevents actual slippage of the mating parts. For example, in disc drive applications, the radial compressive preload of the tolerance ring prevents separation and slippage at the interface between the actuator arm and the pivot bearing during operation and during mechanical shock events. The tolerance ring also acts as a radial spring. In this way, the tolerance ring positions the interior cylindrical part relative to the exterior cylindrical part while making up for radii clearance and manufacturing variations in the radius of the parts.

Additional features have been added to tolerance rings to obtain specific advantages. For example, in U.S. Pat. No. 6,288,878 to Misso et al., circumferential brace portions have been added to the tolerance ring to increase hoop strength. U.S. Pat. No. 6,338,839 to Misso et al. discloses a tolerance ring which provides a low consistent installation force profile.

U.S. Pat. No. 4,790,683 to Cramer, Jr. et al. discloses the use of a conventional tolerance ring in conjunction with a cylindrical shim in applications characterized by structurally significant radial vibration or loading. The shim prevents deformation of the soft underlying material and thereby prevents undesirable partial relief of the radial compression that maintains frictional engagement of the tolerance ring.

State of the art tolerance rings are typically manufactured from a flat metal sheet with stamping, forming, rolling, and other steps to provide ways to recess contacting portions and to achieve a generally cylindrical shape. A perspective view of a prior art tolerance ring is illustrated in FIG. 1.

The tolerance ring can be installed first into a cylindrical hole in an exterior part, such as an actuator arm, so that later a cylindrical inner part, such as an actuator pivot bearing, can be forcibly pushed into the interior of the tolerance ring to create a radial compressive preload that retains the parts by frictional engagement. In this case, the contacting portions may be recessed to a lesser radius than the base portion as well as raised to a greater radius than the base portion. Alternatively, a tolerance ring can be installed first around a cylindrical inner part, such as an actuator pivot bearing. The inner part, together with the tolerance ring, is then forcibly pushed into the interior of the cylindrical hole in an exterior part, such as an actuator arm, to create a radial compressive preload that retains the parts by frictional engagement. In this case, the contacting portions of the tolerance ring are typically raised to a greater radius than the base portion.

Due to the configuration of the disk drive components, the actuator pivot bearing can experience high torque forces. A major contributor to pivot bearing torque is torque "ripple," which is caused by the force imparted upon the pivot bearing surface from the contacting portions of the tolerance ring and the ball bearings inside the actuator pivot bearing. The increased torque forces on the actuator pivot bearing decreases the performance of the disk drive by affecting the rotation of the pivot bearing and increasing energy costs associated with such rotation.

With an increasing demand for improved performance of a disk drive, there remains a continuing need in the art for a tolerance ring that reduces torque "ripple" on the surface of the actuator pivot bearing.

SUMMARY OF THE INVENTION

A tolerance ring configured to reduce torque ripple for a pivot bearing in an actuator arm assembly. The tolerance ring has a cylinder with a predetermined length, and a plurality of contacting portions staggered over at least two rows around the cylinder.

In one embodiment, the contacting portions of the second row are circumferentially displaced with respect to the first row by a distance greater than zero but less than the distance of the contacting portion and the spacing between adjacent contacting portions in the first row. In another embodiment, the contacting portions of a third row are circumferentially displaced with respect to the second row by a distance greater than zero but less than the distance of the contacting portion and the spacing between adjacent contacting portions in the second row.

Each contacting portion can project at a substantially constant radial distance from the cylinder. In another embodiment, the contacting portions in the second row project a first radial distance from the cylinder greater than a second radial distance of contacting portions in the first and third rows.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Figure 1:
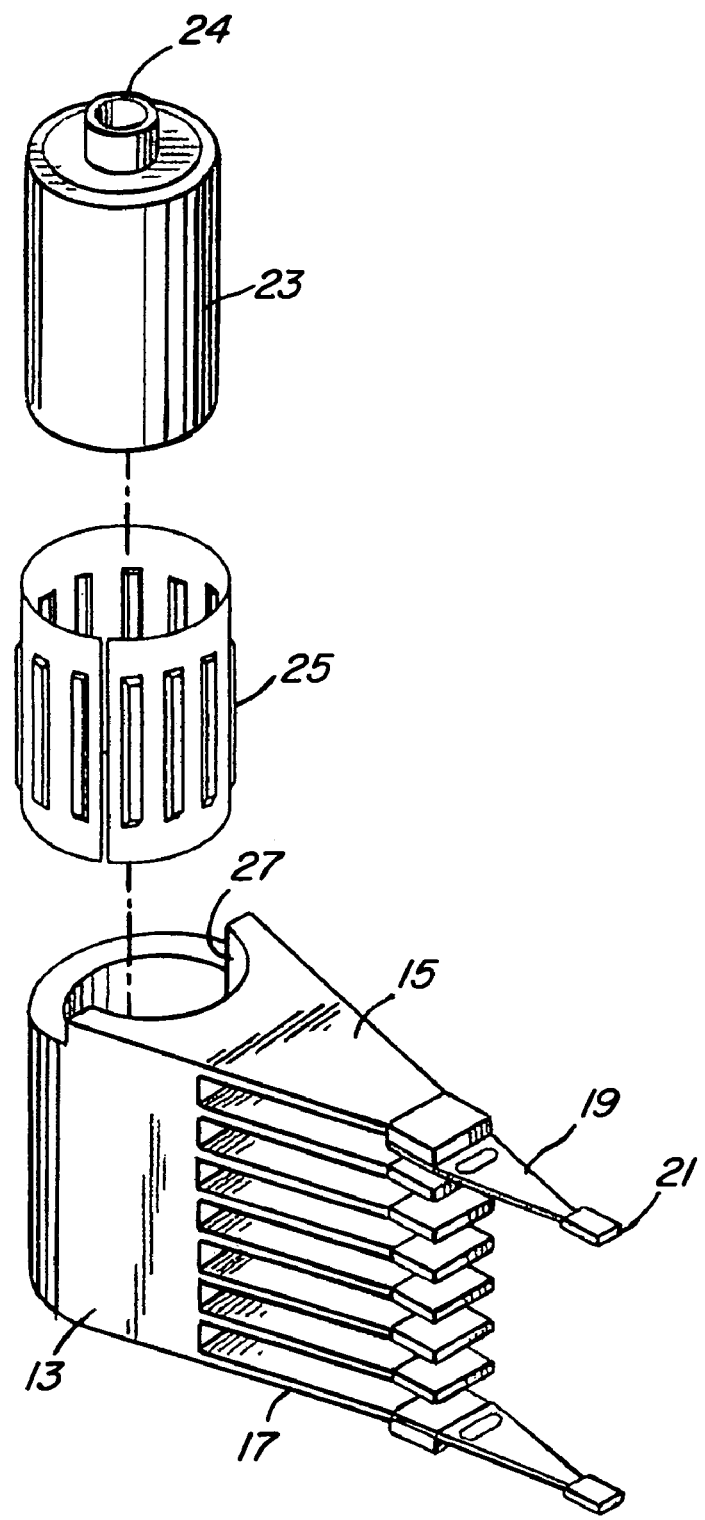
FIG. 1 is an exploded view of a prior art disc drive actuator arm assembly and tolerance ring design.

FIG. 1 is an exploded view of an-actuator arm assembly 13 which includes a pivot bearing cartridge 23. The pivot bearing cartridge 23 is cylindrical in shape and includes a shaft 24 about which the actuator arm assembly 13 rotates. The actuator arm assembly 13 has an opening or bore 27 therein. The pivot bearing cartridge 23 fits within the bore 27 of actuator arm assembly 13. The tolerance ring 25 fits within the space between the bore 27 and the outside diameter of the pivot bearing cartridge 23.

Actuator arm assembly 13 has a plurality of arms 15 in the head-stack assembly 17. Each arm 15 typically carries at least one suspension 19. Attached to the suspension 19 are recording heads (sliders) 21 which include magnetic transducers that magnetize the surface of the disc (not shown) to represent and store the desired data.

The tolerance ring 25 can be installed first into the bore 27 of actuator arm assembly 13 so that later a generally cylindrical inner part, such as the pivot bearing cartridge 23, can be forcibly pushed into the interior of the tolerance ring 25 to create a radial compressive preload that retains the parts by frictional engagement. Alternatively, the tolerance ring 25 can be installed first around the pivot bearing cartridge 23. The pivot bearing cartridge 23, together with the tolerance ring 25, is then forcibly pushed into the bore 27 of actuator arm assembly 13 to create a radial compressive preload that retains the parts by frictional engagement.

Figure 2:
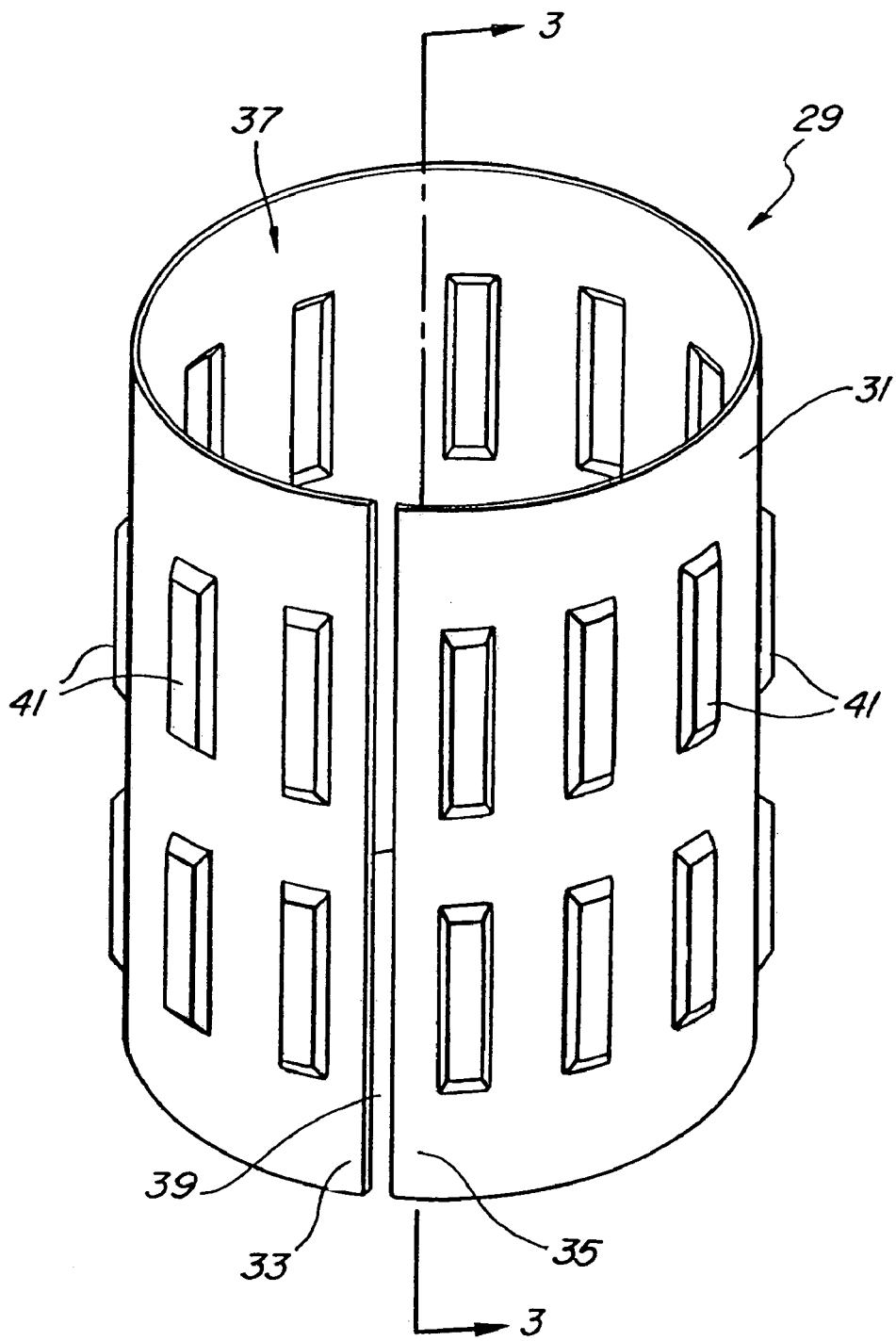
FIG. 2 is a perspective view of a prior art tolerance ring design.

FIG. 2 illustrates a perspective view of a prior art tolerance ring design 29. The tolerance ring 29 is formed from a substantially planar base portion, preferably a 300 Series stainless steel, which is curved to form a cylinder 31. One end of the cylinder 31 has a first edge 33 along the length of the ring. The other end of the cylinder 31 has a second edge 35. The cylinder 31 has a first radius about a central axis and extends for a fixed length parallel to the central axis. Radial expansion and contraction of cylindrical opening 37 is facilitated by a gap 39 along the length of tolerance ring 29 created by the opposite spaced edges 33 and 35.

Figure 3:
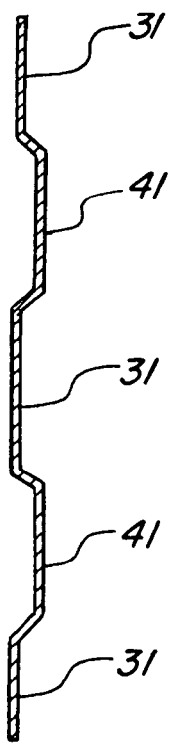
FIG. 3 is a cross-sectional view of the tolerance ring along line 3-3 of FIG. 2.

The tolerance ring 29 has a plurality of contacting portions 41 arranged in one or more rows. The contacting portions 41 generally have a rhomboidal cross-sectional shape extending axially along the cylinder 31. As shown in FIGS. 2 and 3, the contacting portions 41 project radially outward in a direction away from the interior of the tolerance ring 29. It is recognized that alternative configurations known in the art include tolerance rings with contacting portions 41 that project radially inward or project inward and outward in an alternating fashion.

FIG. 3 is a cross-sectional view of the tolerance ring 29 along line 3-3 of FIG. 2. The tolerance ring 29 has two rows of contacting portions 41 that equally project a predetermined radial distance from the base portion 31. These contacting portions 41 withstand forces exerted from the pivot bearing cartridge 23 and the surface walls of the bore 27, when restraining the actuator arm assembly 13 in the hard disk drive. Due to the configuration of the pivot bearing 23, the forces exerted on the contacting portions 41 cause torque "ripple."

Figure 4:
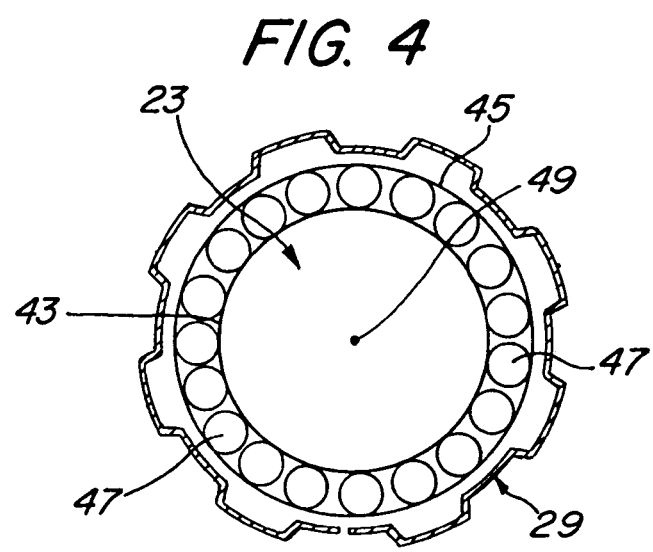
FIG. 4 is a top view of a prior art pivot bearing and tolerance ring.

FIG. 4 is a top view of a prior art pivot bearing 23 and tolerance ring 29. The pivot bearing 23 has an inner bearing sleeve 43 and an outer bearing sleeve 45. Between sleeves 43 and 45 are balls or pins 47 that allow one sleeve to rotate with respect to the other. For example, if the outer bearing sleeve 45 is fixed, the inner bearing sleeve 43 can rotate about the same central axis 49 via the balls 47. Due to the configuration of the pivot bearing 23, discrete forces from the balls 47 are transferred to the outer bearing sleeve 45 and the inner bearing sleeve 43 at the contact points. These forces cause torque ripple, which consequently affects the rotational performance of the pivot bearing 23.

Figure 5:
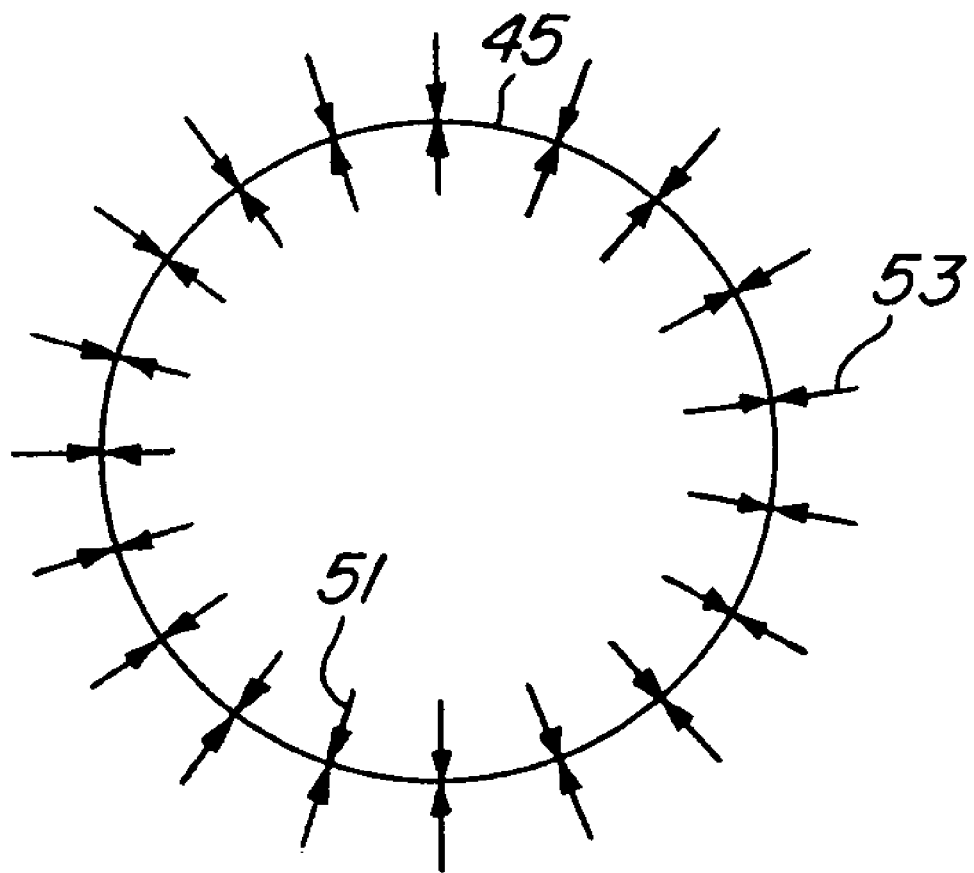
FIG. 5 illustrates a force distribution on the bearing outer sleeve of FIG. 4.

FIG. 5 illustrates a force distribution on the outer bearing sleeve 45 of FIG. 4. The outer bearing sleeve 45 is subjected to discrete forces 51 from the balls 47 and discrete forces 53 from the contacting portions 41 of the tolerance ring 29. When the forces 51 and 53 align, as shown in FIG. 5, the pivot bearing 23 experiences high torque ripple. Meanwhile, when the forces 51 and 53 do not align (not shown), the pivot bearing 23 experiences less torque ripple. Consequently, using the pivot bearing 23 with the prior art tolerance ring 29 will subject the pivot bearing 23 to fluctuating high and low torque ripple that affects the rotational performance of the pivot bearing 23.

Figure 6:
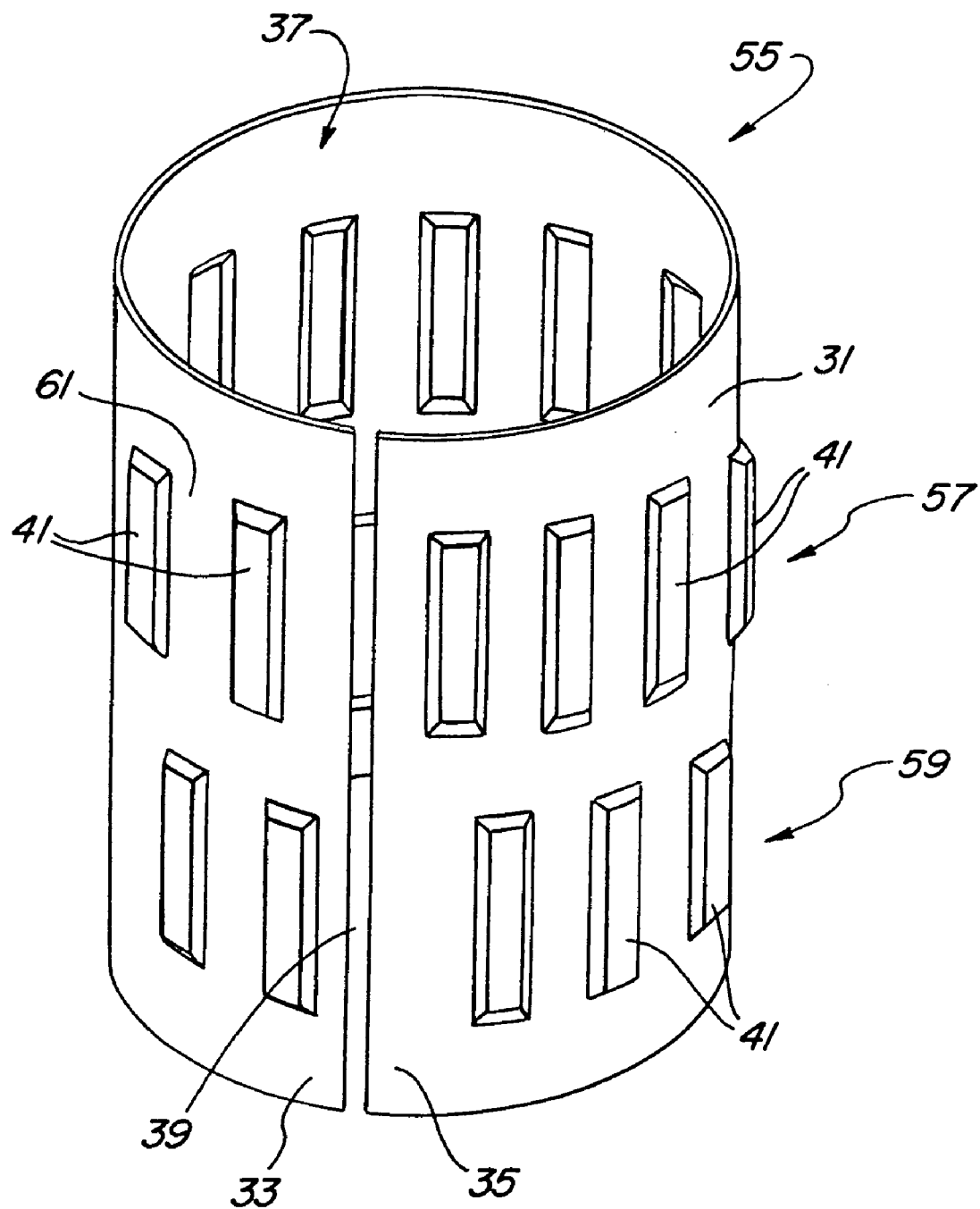
FIG. 6 is a perspective view of a tolerance ring according to one embodiment of the present invention.
Figure 7:
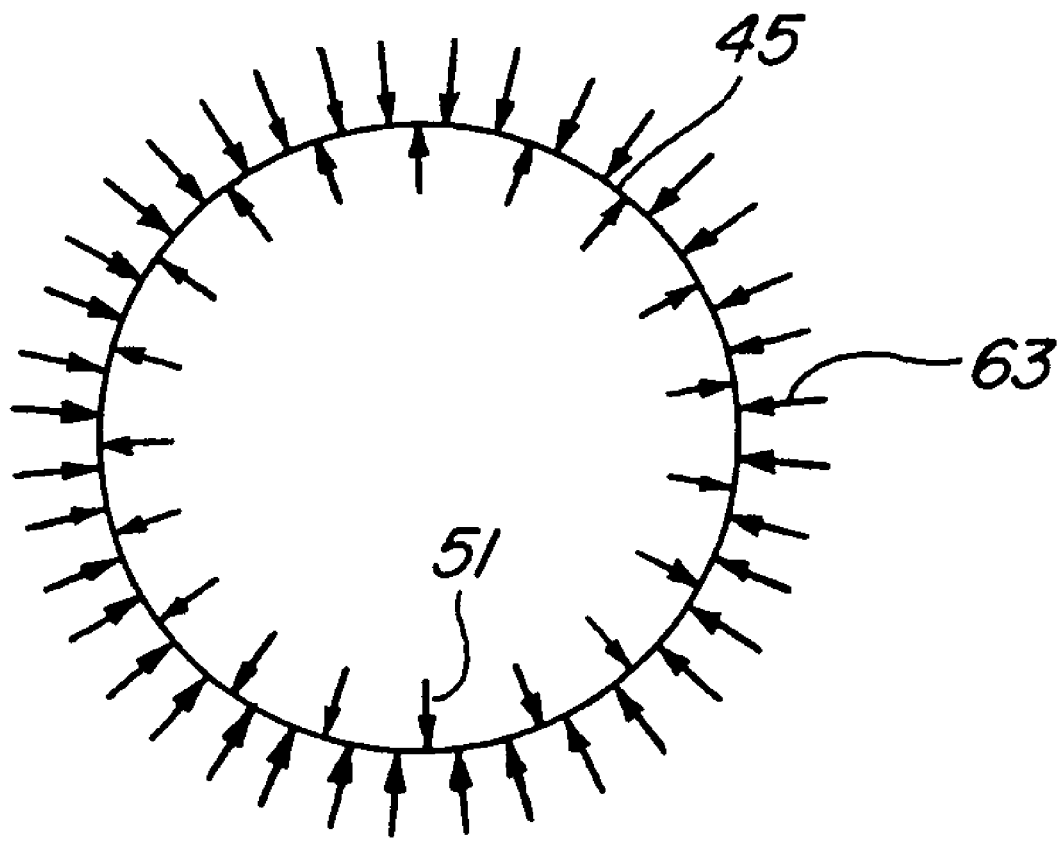
FIG. 7 illustrates a force distribution between the tolerance ring of FIG. 6 and the bearing outer sleeve of FIG. 4.
Figure 8:
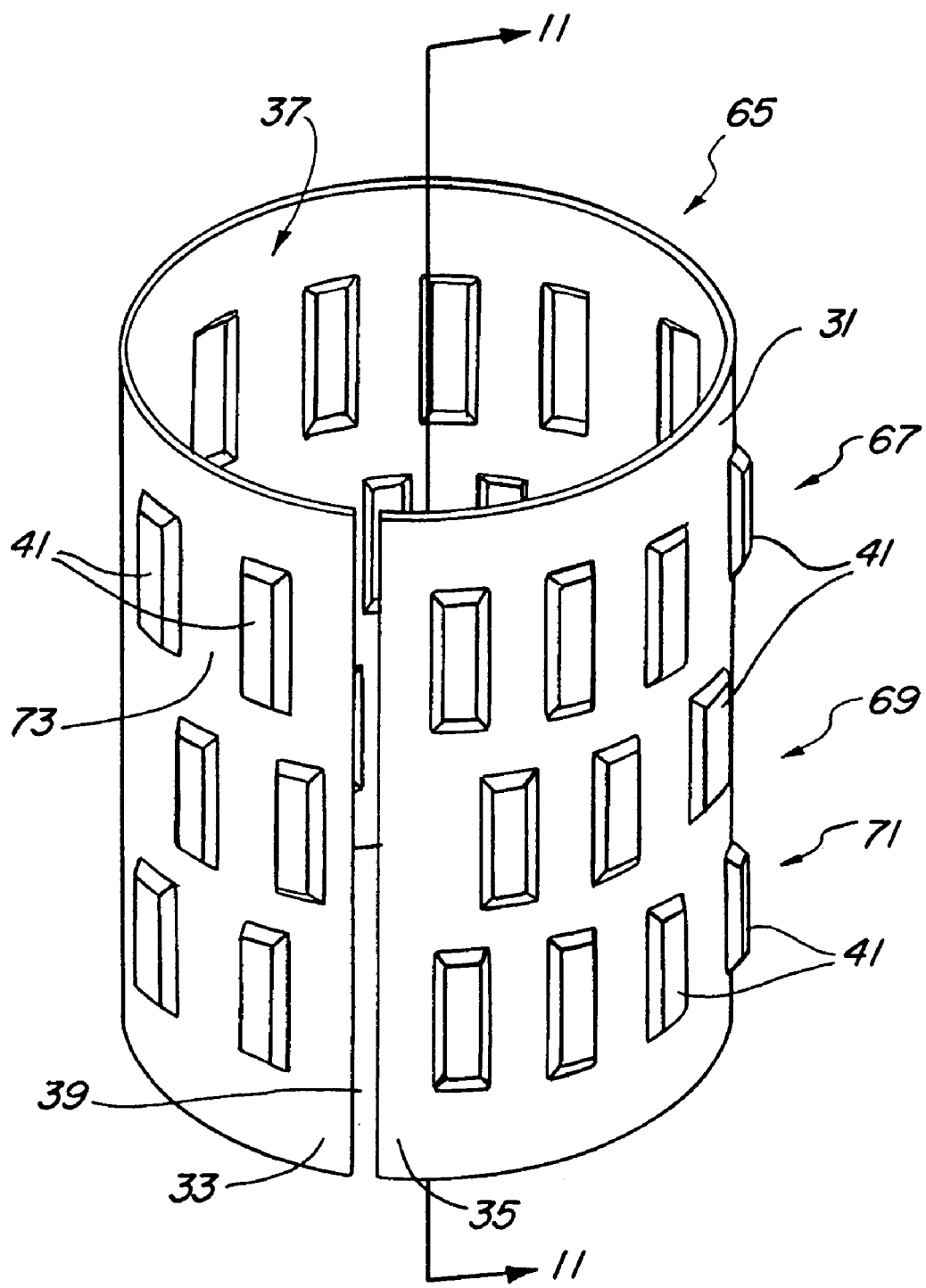
FIG. 8 is a perspective view of a tolerance ring according to another embodiment of the present invention.

To reduce torque "ripple," it is desirable to have as many contacting portions 41 as possible, such that each contacting portion 41 bears little contact force. However, manufacturing limitations prevent more than fifty contacting portions 41. Consequently, to minimize torque "ripple," it is preferable to evenly space or stagger the contacting portions 41, as shown in FIGS. 6-8. Furthermore, it is preferable to position the contacting portions 41 close to the central region of the cylinder 31, which corresponds to the stiff reinforced central portion of the pivot bearing 23.

FIG. 6 is a perspective view of a tolerance ring 55 with a staggered configuration for contacting portions, according to one embodiment of the present invention. The tolerance ring 55 has a first row 57 of contacting portions 41 and a second row 59 of contacting portions 41. In one embodiment, the second row 59 has contacting portions 41 relatively displaced by a distance less than the width of the contacting portions 41 of the first row 57. For example, if the width of the contacting portions is 1.5 mm, then the second row 59 can have contacting portions 41 displaced by a distance of 1 mm relative to the first row 57. In another embodiment, the second row 59 has contacting portions 41 located underneath the spacing 61 between the contacting portions 41 of the first row 57. In yet another embodiment, the second row 59 has contacting portions 41 circumferentially displaced with respect to the first row 57 by a distance greater than zero but less than or equal to half the pitch between adjacent contacting portions 41 in the first row 57. The pitch is the center-to-center distance between adjacent contacting portions 41. The resulting staggered configuration of the tolerance ring 55 minimizes torque ripple, as illustrated in FIG. 7.

FIG. 7 shows a force distribution between the tolerance ring of FIG. 6 and the bearing outer sleeve of FIG. 4. As shown in FIG. 5, the outer bearing sleeve 45 is subjected to discrete forces 51 from the balls 47. The outer bearing sleeve 45 is also subjected to discrete forces 63 from the contacting portions 41 of the tolerance ring 55. Because the forces 51 and 63 do not align together, the pivot bearing 23 experiences less torque ripple. By staggering the contacting portions 41, the forces 63 are distributed evenly around the pivot bearing 23. Consequently, the configuration of the tolerance ring 55 will subject the pivot bearing 23 to less torque ripple and improves the rotational performance of the pivot bearing 23.

FIG. 8 is a perspective view of a tolerance ring 65 with a staggered configuration for contacting portions 41, according to one embodiment of the present invention. The tolerance ring 65 has contacting portions 41 arranged in a first, a second and a third row, shown generally as 67, 69 and 71 respectively. In one embodiment, the second row 69 has contacting portions 41 circumferentially displaced with respect to the first row 67 by a distance greater than zero but less than or equal to half the pitch between adjacent contacting portions 41 in the first row 67. Similarly, the third row 71 has contacting portions 41 circumferentially displaced with respect to the second row 69 by a distance greater than zero but less than or equal to half the pitch between adjacent contacting portions 41 in the first row 69. For example, if the width of the contacting portions is 1.5 mm, then the second row 69 can have contacting portions 41 displaced by a distance of 0.75 mm relative to the first row 67, and the third row 71 can have contacting portions 41 displaced by a distance of 0.75 mm relative to the second row 69 (1.5 mm relative to the first row 65). In another embodiment, the second row 69 has contacting portions 41 located underneath the spacing 73 between the contacting portions 41 of the first row 67, while the third row 71 has contacting portions 41 located underneath the contacting portions 41 of the first row 67. Like tolerance ring 55, the staggered configuration of tolerance ring 65 reduces torque ripple.

Figure 9:
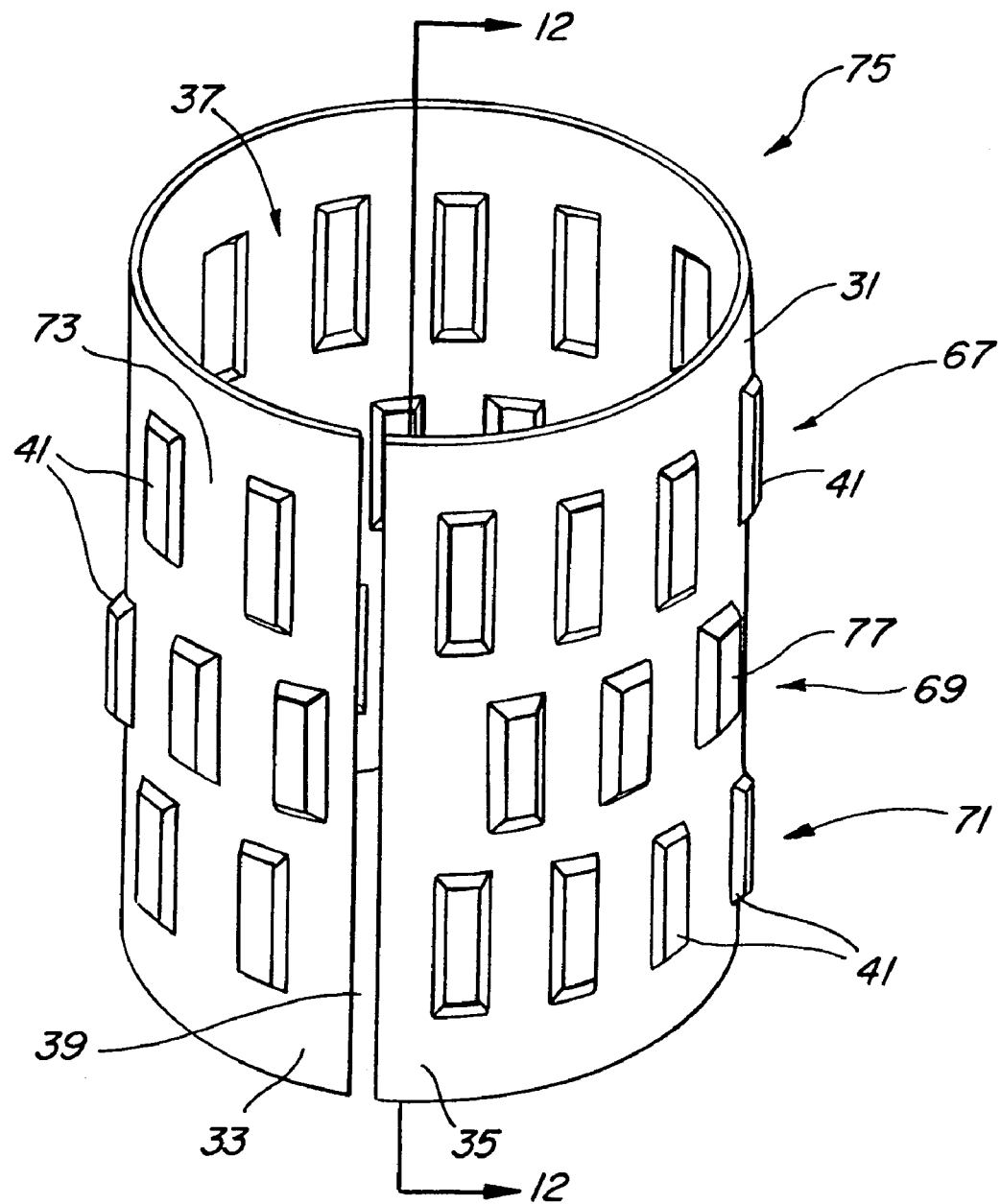
FIG. 9 is a perspective view of a tolerance ring according to another embodiment of the present invention.

In one embodiment, the contacting portions 41 can have a varying height or other geometry to achieve optimal distribution of load for reducing torque ripple. FIG. 9 is a perspective view of a tolerance ring 75 with a staggered configuration for contacting portions, according to one embodiment of the present invention. The tolerance ring 75 has contacting portions 77 in the second row 69. These contacting portions 77 project radially outward by a distance greater than contacting portions 41. In another embodiment, the contacting portions 77 can have a different width or a different geometry from contacting portions 41. The contacting portions 77 are preferably positioned opposite to the stiff reinforced central portion of the pivot bearing 23. By increasing the radial projection of the contacting portions 77 in the middle row 69, the contacting portions 77 will sustain a greater radial compressive preload than the contacting portions 41. The contacting portions 77 will be crushed during assembly to provide better frictional engagement with the pivot bearing 23 and the bore 27. Like tolerance ring 65, the staggered configuration of tolerance ring 75 reduces torque ripple.

Figure 10:
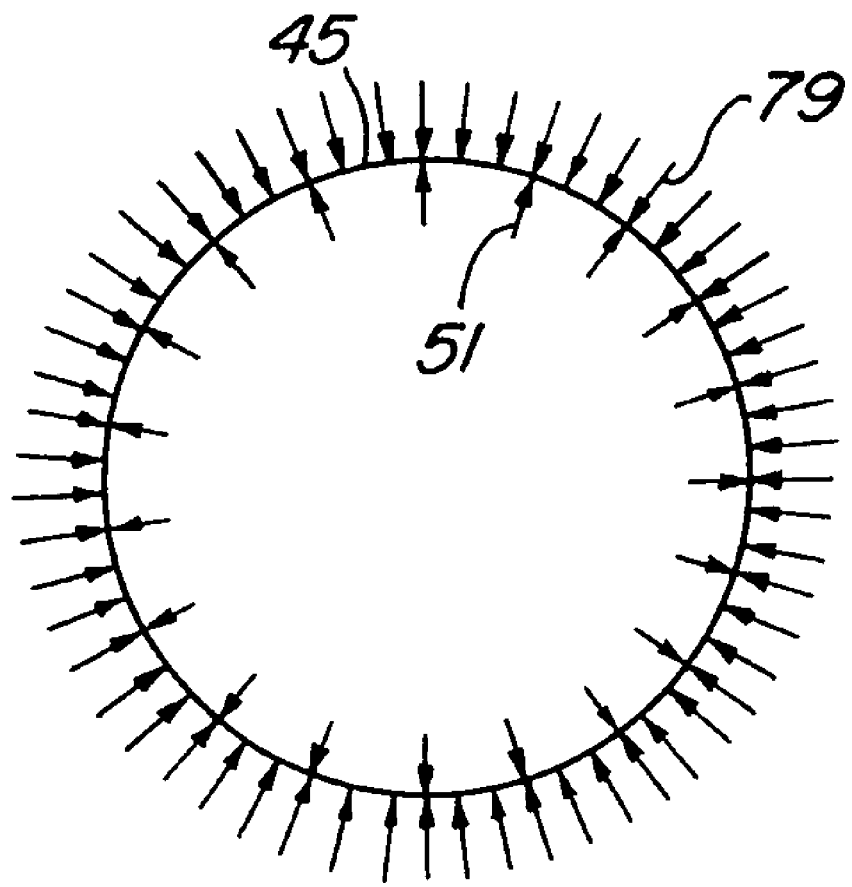
FIG. 10 illustrates a force distribution between the tolerance rings of FIGS. 9 and 10 and the bearing outer sleeve of FIG. 4.

FIG. 10 illustrates a force distribution between the tolerance rings of FIGS. 9 and 10 and the bearing outer sleeve of FIG. 4. As shown in FIG. 5, the outer bearing sleeve 45 is subjected to discrete forces 51 from the balls 47. The outer bearing sleeve 45 is also subjected to discrete forces 79 from the contacting portions 41 and 77. Because the forces 51 and 79 do not align together, the pivot bearing 23 experiences less torque ripple. By staggering the contacting portions 41 and/or 77, the forces 79 are distributed evenly around the pivot bearing 23. Consequently, the configuration of tolerance rings 65 and/or 75 will subject the pivot bearing 23 to less torque ripple and improves the rotational performance of the pivot bearing 23.

Figure 11:
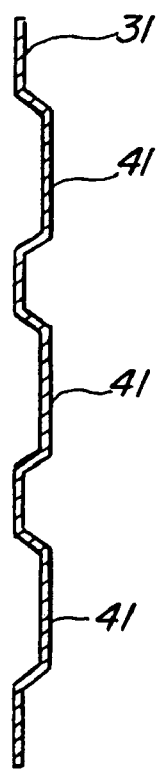
FIG. 11 is a cross-sectional view of the tolerance ring along line 11-11 of FIG. 8.
Figure 12:
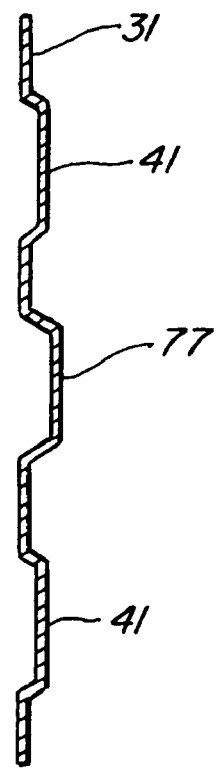
FIG. 12 is a cross-sectional view of the tolerance ring along line 12-12 of FIG. 9.

FIGS. 11 and 12 are cross-sectional views of tolerance rings along lines 11-11 of FIG. 8 and 12-12 of FIG. 9, respectively. FIG. 11 shows three rows of contacting portions 41 that equally project a predetermined radial distance from the cylinder 31. FIG. 12 shows two rows of contacting portions 41 that equally project a predetermined radial distance from the cylinder 31 and one middle row of contacting portions 77 that projects radially outward by a distance greater than contacting portions 41.

While certain exemplary embodiments have been described and shown in the accompanying drawings, it is to be understood that such embodiments are merely illustrative of a tolerance ring having a cylinder with a predetermined length, and a plurality of contacting portions staggered over at least two rows around the cylinder.

What is claimed is:

1. A tolerance ring, comprising:
   a cylinder having a predetermined length; and
   a plurality of contacting portions staggered over at least two rows around the cylinder, at least one row of contacting portions projecting a radial distance from the cylinder that is greater than the radial distance projection of another row of contacting portions.

2. The tolerance ring of claim 1, wherein the cylinder has a gap along the predetermined length of the cylinder, the gap having a first and a second edge.

3. A tolerance ring, comprising:
   a cylinder having a predetermined length; and
   a plurality of contacting portions staggered over at least two rows around the cylinder, wherein the contacting portions of one row are larger than the contacting portions of another.

4. The tolerance ring of claim 3, wherein each contacting portion projects a substantially constant radial distance from the cylinder.

5. The tolerance ring of claim 3, wherein the cylinder has a gap along the predetermined length of the cylinder, the gap having a first and a second edge.

6. A tolerance ring configured to reduce torque ripple for a pivot bearing, comprising:
   a cylinder having a predetermined length along an axis of rotation; and
   a first and a second row of contacting portions, each contacting portion in the first and second row having a length and width, arranged around a surface of the cylinder, with the length of each contacting portion aligned with the axis of rotation of the cylinder, the contacting portions of the second row circumferentially displaced with respect to the first row by a distance greater than zero but less than or equal to half the pitch between adjacent contacting portions in the first row.

7. The tolerance ring of claim 6, further comprising a third row of contacting portions, each contacting portion in the third row having a length and width, arranged around a surface of the cylinder with the length of each contacting portion aligned with the axis of rotation of the cylinder, the second row positioned between the first and third rows along the predetermined length, and the contacting portions of the third row circumferentially displaced with respect to the second row by a distance greater than zero but less than or equal to half the pitch between adjacent contacting portions in the second row.

8. The tolerance ring of claim 7, wherein the contacting portions in the second row project a radial distance from the cylinder greater than radial distance projections of contacting portions in the first and third rows.

9. A tolerance ring configured to minimize torque ripple for a pivot bearing, comprising:
   a cylinder having a predetermined length along an axis of rotation;
   a first row of contacting portions, each contacting portion having a length and width, arranged around a surface of the cylinder with the length of each contact portion aligned with the axis of rotation of the cylinder, at a first location along the predetermined length of the cylinder; and
   a second row of contacting portions, each contacting portion having a length and width, arranged around the surface of the cylinder, with the length of each contact portion aligned with the axis of rotation of the cylinder at a second location along the predetermined length, below the first location, and displaced circumferentially with respect to the first row by a distance greater than zero but less than or equal to half the pitch between adjacent contacting portions in the first row.

10. The tolerance ring of claim 9, further comprising a third row of contacting portions, each contacting portion having a length and width, arranged around the surface of the cylinder, with the length of each contacting portion aligned with the axis of rotation of the cylinder, at a third location along the predetermined length, the second row positioned between the first and third rows along the predetermined length, and the contacting portions of the third row circumferentially displaced with respect to the second row by a distance greater than zero but less than or equal to half the pitch between adjacent contacting portions in the second row.

11. The tolerance ring of claim 10, wherein the contacting portions in the second row project a radial distance from the cylinder greater than the radial distance of contacting portions in the first and third rows.

12. The tolerance ring of claim 10, wherein the contacting portions of the second row are wider than the contacting portions in the first and third rows.

13. The tolerance ring of claim 10, wherein the contacting portions of the second row have a geometry different than the contacting portions in the first and third rows.

14. The tolerance ring of claim 9, wherein each contacting portion projects a fixed radial distance from the cylinder.

15. The tolerance ring of claim 9, wherein the cylinder has a gap along the predetermined length of the cylinder, the gap having a first and a second edge.

16. A tolerance ring, comprising:
    a cylinder having a predetermined length; and
    a first and a second row of contacting portions arranged around the surface of the cylinder, the contacting portions of the first row projecting a first radial distance from the cylinder and the contacting portions of the second row projecting a second radial distance from the cylinder, the second radial distance being greater than the first radial distance.

17. The tolerance ring of claim 16, wherein the contacting portions of the second row are circumferentially displaced with respect to the first row by a distance greater than zero but less than or equal to half the pitch between adjacent contacting portions in the first row.

18. The tolerance ring of claims 16 or 17, further comprising a third row of contacting portions arranged around the surface of the cylinder, the second row being positioned between the first and third rows along the predetermined length, the contacting portions of the third row projecting a third radial distance from the cylinder and circumferentially displaced with respect to the second row by a distance greater than zero but less than or equal to half the pitch between adjacent contacting portions in the second row.

19. The tolerance ring of claim 16, wherein the contacting portions of the second row are wider than the contacting portions in the first and third rows.

20. The tolerance ring of claim 16, wherein the cylinder has a gap along the predetermined length of the cylinder, the gap having a first and a second edge.

* * * * *